US007389991B2

United States Patent
Riggi, Jr. et al.

(10) Patent No.: US 7,389,991 B2
(45) Date of Patent: Jun. 24, 2008

(54) LEAKAGE SEAL FOR GAS PATH OF GAS TURBINE

(75) Inventors: Vincent T. Riggi, Jr., Saratoga Springs, NY (US); Ronald A. Riggi, Saratoga Springs, NY (US)

(73) Assignee: Turbine Services, Ltd., Sarasota Springs, NY (US)

( * ) Notice: Subject to any disclaimer, the term of this patent is extended or adjusted under 35 U.S.C. 154(b) by 82 days.

(21) Appl. No.: 11/236,243

(22) Filed: Sep. 27, 2005

(65) Prior Publication Data

US 2007/0069478 A1    Mar. 29, 2007

(51) Int. Cl.
*F16J 15/16* (2006.01)
(52) U.S. Cl. .................. 277/500; 277/644; 415/230; 415/231
(58) Field of Classification Search .............. 415/171.1, 415/173.5, 174.5, 230, 173.3, 174.2, 231; 277/500, 644
See application file for complete search history.

(56) References Cited

U.S. PATENT DOCUMENTS 5,509,669 A * 4/1996 Wolfe et al. .................. 277/654
5,586,773 A   12/1996 Bagepalli et al.
5,657,998 A    8/1997 Dinc et al.
6,676,130 B2 * 1/2004 Schmitt ....................... 277/349
6,702,549 B2 * 3/2004 Tiemann ....................... 415/135

OTHER PUBLICATIONS hook. Dictionary.com. Dictionary.com Unabridged (v 1.1). Random House, Inc. http://dictionary.reference.com/browse/hook (accessed: Aug. 27, 2007).*

* cited by examiner

*Primary Examiner*—Patricia Engle
*Assistant Examiner*—Gilbert Y Lee
(74) *Attorney, Agent, or Firm*—Wood, Phillips, Katz, Clark & Mortimer

(57) ABSTRACT

A leakage seal for use in a gas path between two relatively rotatable members of a gas turbine comprises a foil layer and a cloth layer. The foil layer has two expansive surfaces, a single one of which is covered by the cloth layer. The leakage seal has a proximal end, a distal end, and a generally flat region between the proximal and distal ends. The proximal end is attached to an associated one of the turbine members. The distal end diverges from the generally flat region so as to define a curved hook, along which the cloth portion is wrapped over the foil layer, when the distal end is viewed in cross-section.

4 Claims, 1 Drawing Sheet

US 7,389,991 B2

LEAKAGE SEAL FOR GAS PATH OF GAS TURBINE

TECHNICAL FIELD OF THE INVENTION

This invention pertains to a leakage seal of a type comprising a foil layer and a cloth layer, for a gas path of a gas turbine, between two relatively rotatable members of the gas turbine.

BACKGROUND OF THE INVENTION

As used in a gas path between two relatively rotatable members of a gas turbine, which may be for a gas turbine generator or for a gas turbine engine, a leakage seal of the type noted above comprises a foil layer and a cloth layer. The foil layer is made from a metallic, ceramic, or polymeric foil. The cloth layer is made, as by weaving or knitting, from metallic, ceramic, or polymeric wires, fibers, or filaments.

Leakage seals of the type noted above are exemplified in U.S. Pat. Nos. 5,509,669, 5,586,773, and 5,657,998, the disclosures of which are incorporated herein by reference.

SUMMARY OF THE INVENTION

This invention provides a leakage seal of the type noted above, for use in a gas path between two relatively rotatable members of a gas turbine, either a gas turbine generator or a gas turbine engine. The leakage seal comprises a foil layer and a cloth layer. The foil layer has two expansive surfaces, a single one of which is covered by the cloth layer. The leakage seal has a proximal end, a distal end, and a generally planar region between the proximal and distal ends.

The proximal end is attachable to an associated one of the turbine members. The distal end diverges from the generally planar region. Preferably, the distal end diverges from the generally planar region so as to define a hook, along which the cloth portion is wrapped over the foil layer, when the distal end is viewed in cross-section. Preferably, the hook is a curved hook.

Thus, a sealing arrangement is contemplated, which comprises two coacting seals, each seal conforming to the leakage seal provided by this invention, as described above. The proximal end of each of the coacting seals is attached to a respective one of the turbine members. The distal ends of the coacting seals diverge away from each other. At the generally flat regions of the coacting seals, the cloth layers of the coacting seals bear against each other.

Also, a sealing arrangement is contemplated, which comprises a plural number of similar seals, each seal conforming to the leakage seal provided by this invention, as described above. While the proximal ends of the seals are attached to the same one of the turbine members, the cloth layers of the seals bear against the other one of the turbine members, where the distal ends of the seals diverge from the generally planar regions of the seals.

DETAILED DESCRIPTION OF THE ILLUSTRATED EMBODIMENTS

Figure 1:
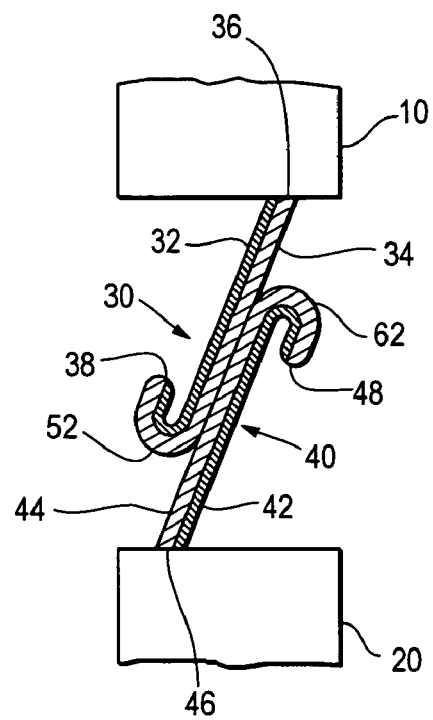
FIG. 1 is a schematic, cross-section of a two relatively rotatable members of a gas turbine, along with two coacting seals, each seal being a leakage seal embodying this invention. The cross-section is taken in a plane comprising a radius, about which relative rotation of the turbine members occurs. Then radius is not indicated in FIG. 1.

As illustrated schematically in FIG. 1, a gas turbine comprises two relatively rotatable members 10, 20, between which a gas path is defined, along with two coacting seals 30, 40, each seal being a leakage seal embodying this invention. The seal 30 comprises a foil layer 32 and a cloth layer 34 and has a proximal end 36, a distal end 38, and a generally flat region between the respective ends 36, 38. The seal 40 comprises a foil layer 42 and a cloth layer 44 and has a proximal end 46, a distal end 48, and a generally flat region between the respective ends 46, 48.

The proximal end 36 of the seal 30 is attached, by means (not illustrated) such as welding or screws, to the turbine member 10. The proximal end 46 of the seal 40 is attached, similarly, to the turbine member 20. The distal end 38 of the seal 30 diverges from the generally planar region between the respective ends 36, 38, of the seal 30, so as to define a curved hook 52, along which the cloth layer 34 is wrapped over the foil layer 32, when the distal end 38 of the seal 30 is viewed in cross-section. The distal end 48 of the seal 40 diverges from the generally planar region between the respective ends 46, 48, of the seal 40, so as to define a curved hook 62, along which the cloth layer 44 is wrapped over the foil layer 42, when the distal end 48 of the seal 40 is viewed in cross-section.

The seals 30, 40, are positioned and are oriented so that the distal ends 38, 48, diverge oppositely and so that at the generally flat regions between the proximal ends 36, 46, and the distal ends 38, 48, the cloth layers 34, 44, bear against each other. Thus, the foil layer 32 of the seal 30 does not contact the cloth layer 44 of the seal 40. Also, the foil layer 42 of the seal 40 does not contact the cloth layer 34 of the seal 30.

Figure 2:
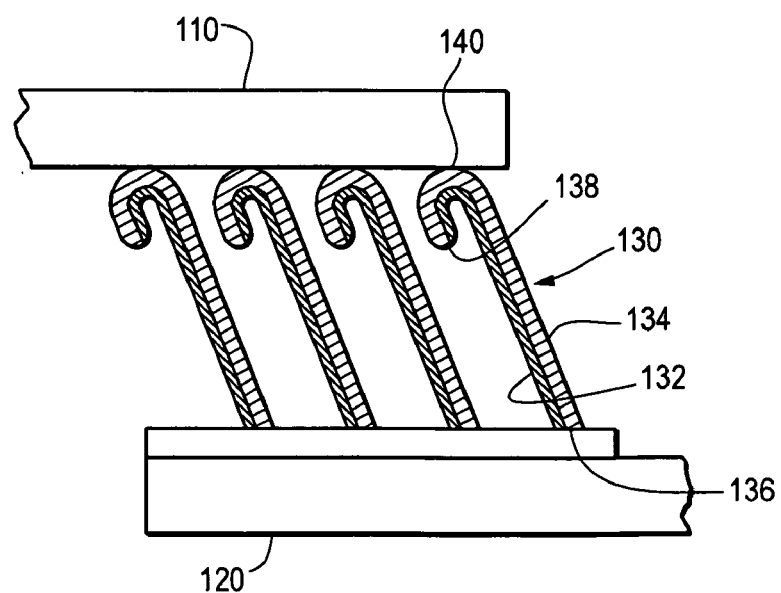
FIG. 2 is a schematic, cross-section of two relatively rotatable members of a gas turbine, along with four similar seals, each seal being a leakage seal embodying this invention. The cross-section is taken in a plane comprising a radius, about which relative rotation of the turbine members occurs. The radius is not indicated in FIG. 2.

As illustrated in FIG. 2, a gas turbine comprises two relatively rotatable members 110, 120, between which a gas path is defined, along with four similar seals 130, each seal being a leakage seal embodying this invention. Each seal 130 comprises a foil layer 132 and a cloth layer 134 and has a proximal end 136, a distal end 138, and a generally flat region between the respective ends 136, 138.

The proximal end 136 of the seal 130 is attached, by means (not illustrated) such as welding or screws, to the turbine member 110. The distal end 138 of each seal 130 diverges from the generally planar region between the respective ends 136, 138, of said seal 130, so as to define a curved hook 140, along which the cloth layer 134 of said seal 130 is wrapped over the foil layer 132 of said seal 130, when the distal end 138 of said seal 130 is viewed in cross-section. At the curved hook 140 at the distal end 138 of each seal 130, where the cloth layer 134 of said seal is wrapped over the foil layer 132 of said seal 130, the cloth layer 134 of said seal 130 bears against the turbine member 120. Thus, at the curved hook 140 at the distal end 138 of each seal 130, the foil layer 132 of said seal 130 does not contact the turbine member 120.

In each seal illustrated in the drawings and described above, the foil layer is a single layer of metallic foil, which is made, preferably, from a nickel-based superalloy, such as X-750. Alternatively, the foil layer is comprised of two or more sub-layers. In each seal illustrated in the drawings and described above, the cloth layer is a single layer of wire cloth, as woven or knitted from wires made, preferably, of a hightemperature, cobalt-based superalloy, such as L-605. Alternatively, the cloth layer is comprised of two or more sub-layers.

The invention claimed is:

1. A sealing arrangement for use in a gas path between two relatively rotatable members of a gas turbine, the sealing arrangement comprising:
   a pair of coacting leakage seals each having
      a foil layer and a cloth layer, wherein the foil layer has two expansive surfaces, only a single one of which is covered by the cloth layer,
      a proximal end, a distal end, and a generally planar region between the proximal and distal ends,
   wherein
      the proximal end of one of the coacting seals is attachable to an associated one of the turbine members,
      the proximal end of the other of the coacting seals is attachable to the other turbine member, and
      the cloth layer of the coacting seals bear against each other along the generally planar region and the distal end of each coacting seal including both the foil layer and the cloth layer diverging in opposite directions from the generally planar region when the coacting seals are attached to associated turbine members.

2. The leakage seal of claim 1, wherein the distal end of each coacting seal diverges from the generally planar region so as to define a hook, along which the cloth portion is wrapped over the foil layer, when the distal end is viewed in cross-section.

3. The leakage seal of claim 1, wherein the distal end of each coacting seal diverges from the generally planar region so as to define a curved hook, along which the cloth portion is wrapped over the foil layer, when the distal end is viewed in cross-section.

4. A sealing arrangement for use in a gas path between two relatively rotatable members of a gas turbine, the sealing arrangement comprising:
   a pair of coacting leakage seals each having
      a foil layer having a proximal end, a distal end, and a generally planar region between the proximal and distal ends, said foil layer being curved back at a distal end to overlie itself and having first and second expansive surfaces with the first expansive surface facing itself where overlying itself at its distal end, and
      a cloth layer covering only said foil layer second expansive surface;
   wherein
   the proximal end of one of the coacting seals is attachable to an associated one of the turbine members,
      the proximal end of the other of the coacting seals is attachable to the other turbine member, and
      the cloth layer of the coacting seals bear against each other along the generally planar region and the distal end of each coacting seal including both the foil layer and the cloth layer diverging in opposite directions from the generally planar region when the coacting seals are attached to associated turbine members.

* * * * *